(12) United States Patent  (10) Patent No.: US 8,951,434 B2
Myers et al.  (45) Date of Patent: Feb. 10, 2015

(54) GLASS ETCHING MEDIA AND METHODS

(71) Applicant: Corning Incorporated, Corning, NY (US)

(72) Inventors: Timothy Edward Myers, Painted Post, NY (US); Shyamala Shanmugam, Painted Post, NY (US); Alan Thomas Stephens, II, Beaver Dams, NY (US); Matthew John Towner, Campbell, NY (US); Kevin William Uhlig, Horseheads, NY (US); Lu Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/889,689

(22) Filed: May 8, 2013

(65) Prior Publication Data

US 2013/0299452 A1  Nov. 14, 2013

Related U.S. Application Data

(60) Provisional application No. 61/645,195, filed on May 10, 2012.

(51) Int. Cl.
C09K 13/06 (2006.01)
C09K 13/08 (2006.01)
C03C 15/00 (2006.01)
C03C 15/02 (2006.01)

(52) U.S. Cl.
CPC ............. *C09K 13/08* (2013.01); *C03C 15/00* (2013.01); *C03C 15/02* (2013.01); *C03C 2218/34* (2013.01)

USPC ........... 252/79.4; 252/79.2; 252/79.3; 216/97

(58) Field of Classification Search
USPC .......... 252/79.1, 79.2, 79.3, 79.4; 216/97, 98, 216/99, 104, 107

See application file for complete search history.

(56) References Cited

U.S. PATENT DOCUMENTS

| 541,573 A | 6/1895 | Selwig |
| 4,624,729 A * | 11/1986 | Bresciani et al. ........ 156/345.11 |
| 4,821,626 A | 4/1989 | Rossi et al. |
| 5,246,540 A | 9/1993 | Soda |
| 5,688,366 A | 11/1997 | Ichinose et al. |

(Continued)

FOREIGN PATENT DOCUMENTS

| DE | 101 01 926 | 10/2001 |
| GB | 1 145 404 | 3/1990 |

(Continued)

OTHER PUBLICATIONS

Patent Cooperation Treaty International Notification of Transmittal of the International Search Report and the Written Opinion of the International Searching Authority, international application No. PCT/US2013/040110; mailing date Aug. 13, 2013, 9 pages.

*Primary Examiner* — Lan Vinh

(74) *Attorney, Agent, or Firm* — Timothy M Schaeberle

(57) ABSTRACT

A glass etching medium and a method for etching the surface of a glass sheet to modify surface flaw characteristics without degrading the optical quality of the sheet surface, wherein the etching medium is a thickened aqueous acidic fluoride-containing paste comprising at least one dissolved, water-soluble, high-molecular-weight poly (ethylene oxide) polymer thickener.

19 Claims, 2 Drawing Sheets

(56) References Cited

U.S. PATENT DOCUMENTS

| | | | |
|---|---|---|---|
| 6,337,029 B1 | 1/2002 | Hardy et al. | |
| 6,471,880 B1 * | 10/2002 | Trouve et al. | 216/31 |
| 6,807,824 B1 | 10/2004 | Miwa | |
| 7,837,890 B2 | 11/2010 | Stockum et al. | |
| 8,592,248 B2 * | 11/2013 | Cheng et al. | 438/98 |
| 2003/0160026 A1 | 8/2003 | Klein et al. | 216/83 |
| 2004/0138079 A1 * | 7/2004 | Becker et al. | 510/279 |
| 2006/0118759 A1 | 6/2006 | Klein et al. | 252/79.1 |
| 2006/0174912 A1 * | 8/2006 | Emami et al. | 134/1.3 |
| 2009/0233235 A1 * | 9/2009 | Williamson et al. | 430/302 |
| 2010/0068889 A1 | 3/2010 | Stockum et al. | |
| 2010/0261065 A1 * | 10/2010 | Babinec et al. | 429/246 |
| 2012/0122271 A1 * | 5/2012 | Cheng et al. | 438/98 |
| 2012/0180852 A1 * | 7/2012 | Cheng et al. | 136/252 |

FOREIGN PATENT DOCUMENTS

| | | |
|---|---|---|
| WO | 00/40518 | 7/2000 |
| WO | 2004/020551 | 3/2004 |

* cited by examiner

GLASS ETCHING MEDIA AND METHODS

CROSS-REFERENCE TO RELATED APPLICATIONS

This application claims the benefit of priority under 35 U.S.C. §119 of U.S. Provisional Application Ser. No. 61/645,195, filed on May 10, 2012, the content of which is relied upon and incorporated herein by reference in its entirety.

BACKGROUND

1. Field

The present invention is in the field of glass manufacturing and is principally concerned with materials and methods for the finishing of glass sheets for electronic information displays.

2. Technical Background

There is presently a very high demand for glass sheet exhibiting improved properties for use in advanced information displays for televisions, computer display screens, mobile phones, laptop and tablet computers, media players, and other electronic devices. Among the glass properties required by manufacturers and users of such devices are light weight, high resistance to damage from impacts and flexural stresses, good resistance to surface damage from scratching and other abrasion, and excellent optical quality. Desirable optical properties include freedom from light-scattering surface or internal flaws and, in many cases, a surface finish that can reduce glare and otherwise improve the optical quality of displayed images.

The need for light weight dictates that glass sheet of slight thickness be used, e.g., glass below 2 mm in thickness and more commonly below 1 mm or even 0.5 mm in thickness. Meeting the high physical durability requirements in glass sheet in these thickness ranges requires that some form of glass strengthening be used. Thus tempering of the sheets to develop surface compression layers that increase the resistance of the glass sheets to stress breakage is commonly employed, with the presenting preferred tempering method involving chemical tempering, including so-called ion-exchange strengthening.

While ion-exchange strengthening is capable of developing very high surface stress levels, and thus very high flexural strengths, in thin sheet glass sheets of appropriate composition, further improvements in the resistance of the sheets to impact and abrasion damage have become necessary as the thicknesses of the sheets continue to be reduced. Statistical studies of impact breakage variability in thin strengthened glass sheets have determined that surface quality variations, more particularly variable surface flawing resulting, for example, from the handling of the sheets during manufacture, play a role.

A recently discovered solution to the problem of impact strength variability is the use of a light surface etching treatment to moderate surface flaw behavior. Etching can also be useful to impart anti-glare characteristics to the surfaces of the sheets and/or to imprint a logo or other marking on sheet surfaces. However, such etching treatments must be carefully controlled in order to avoid undesirable surface damage or degradation of surface optical properties.

Among the etching media found useful for improving the properties of display glass sheet are aqueous fluoride solutions optionally comprising additional mineral acids. These are typically applied to the surfaces of the sheets by dipping or spraying. However, several problems relating to the use of these media and methods remain to be solved.

One problem relates to the volatility of the acid components of these etching media, e.g., HF and HCl volatility, the vaporization of these constituents acting to reduce media acid concentrations over time. In addition, where a bath of etching medium is used for dipping, the rising concentrations of dissolved glass constituents and sediments in the bath, as well as the consumption of the active fluoride etchants over time, make it difficult to maintain etching efficiency over reasonable bath service intervals.

Securing the result of uniform etching over large sheet surface areas is also impeded by the mobility of presently available etching media and methods. The low viscosities of conventional acid mixtures can result in uneven flow patterns that can cause uneven surface removal and visibly non-uniform surface optical properties. In the case of anti-glare surface finishes involving the use of patterned masks to achieve controlled differential etching rates, uncontrolled media flow can disturb weakly adhering mask materials and/or produce non-uniform anti-glare properties, including visible flow lines, light and dark spots, locally excessive haze or sparkle (as measured by pixel power standard deviation, or PPD), and/or a higher than desired DOI (distinctness of image) value. These defects affect the suitability of the etched antiglare surface finishes for enhancing the image quality of pixelated information displays. Slow sheet immersion and withdrawal rates can minimize mask damage and improve etch patterning, but result in larger etching time differences as between the leading and trailing edges of the sheets, again affecting optical uniformity across the breadth of sheet surfaces.

The problem of unwanted etching medium flow has been addressed in the past through the use of additives to thicken and partially immobilize the medium. However, previously known formulations comprising thickeners introduce new problems that make them unsuitable for the strengthening and/or re-surfacing of optical display glasses. One problem with conventional thickening approaches is that of securing pH levels sufficiently acidic to achieve the required strengthening and other surface-enhancing effects within times sufficiently short to prevent optical damage (e.g., visible hazing or frosting) to sheet surfaces. The use of high concentrations of thickeners can dilute the effectiveness of the media and require unacceptably long etching times. On the other hand, excessively thickened media make it difficult to ensure uniform distribution and thus uniform etching of sheet glass surfaces.

Another problem relates to the instability of conventional thickeners (e.g., xanthan gum, sugars, cellulose derivatives, etc.) in highly acidic media. In particular, the oxidation of such thickeners by pH-controlling media constituents such as sulfuric acid can cause media discoloration and/or loss of thickener effectiveness.

SUMMARY

In accordance with the present disclosure, etching formulations comprising thickeners that are both compatible with present highly acidic fluoride materials and effective at low concentrations to significantly increase the viscosity of those materials are provided. Also provided are methods for uniformly applying such formulations to glass surfaces in a way that produces etched glass sheets free of visible surface defects with uniform optical properties.

In a first aspect, therefore, embodiments of the present invention include glass etching media comprising at least one water-soluble inorganic fluoride compound, at least one secondary strong acid, a dissolved, water-soluble, high-molecular-weight poly (ethylene oxide) polymer thickener, and water. In particular embodiments, the dissolved water-soluble high-molecular weight thickener is a thickener that is resistant to oxidative decomposition in aqueous $H_2SO_4$ at $H_2SO_4$ concentrations in the range of about 1-7M. In further embodiments, the selected medium will have an etching rate for aluminosilicate glasses that is substantially equivalent to that of a second medium of equivalent composition absent the polymer thickener.

Particularly included within the scope of the present disclosure are media wherein the at least one fluoride compound comprises HF. In specific cases the HF is present in the medium at a concentration in the range of about 1-7M. In those and other embodiments the at least one secondary strong acid included in the medium comprises an acid selected from the group consisting of mineral acids and strong organic acids.

In a second aspect, embodiments of the present invention include methods for etching a glass sheet comprising a step of exposing a surface of the sheet to an acidic fluoride etching medium comprising a dissolved, water-soluble, high-molecular-weight poly (ethylene oxide) polymer thickener. For the purpose of applying such methods to the production of electronic display glass sheets, substantially all areas of the surfaces of the sheets to be exposed to the etching medium are exposed for a substantially identical selected exposure time. The selected exposure time, while being at least sufficient to reduce the impact fracture strength variability of the glass, will be less than a time resulting in a strengthened glass sheet having a haze level in excess of about 20%. Further, in embodiments wherein the sheets being exposed to the etching medium are first provided with a surface masking layer for producing an anti-glare surface on the sheets, the selected exposure time will be greater than a time that produces an anti-glare surface with a DOI exceeding about 80, or a time that produces a PPD level exceeding about 8%.

In further particular embodiments, the etching medium used to carry out exposure step is substantially free of dissolved glass constituents, thereby insuring uniform and predictable etching effectiveness across the entire breadth of a sheet surface. In all such cases the disclosed methods can be applied either to unmasked glass sheet surfaces or to masked sheet surfaces, i.e., surfaces comprising areas masked against exposure to the etching medium.

BRIEF DESCRIPTION OF THE DRAWINGS

Illustrative embodiments of the glass etching methods and materials provided in accordance with the present disclosure are set forth in further detail below with reference to the appended drawings, wherein.

DETAILED DESCRIPTION

Figure 1:
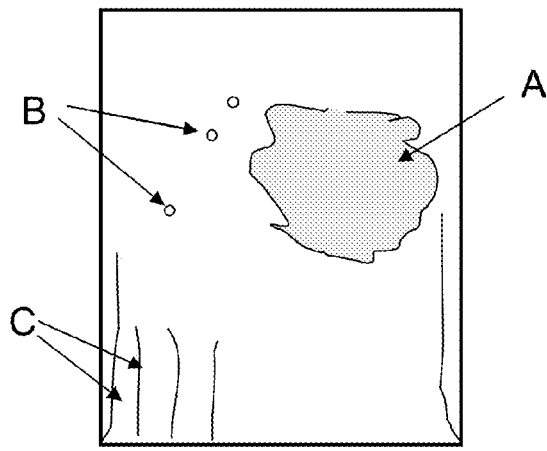
FIG. 1 schematically illustrates typical defect types in anti-glare surface layers conventionally etched on display glass sheet.

While the etching media and methods of the present disclosure may be widely applied to the strengthening and/or surface finishing of glass articles of widely varying composition and configuration, they offer particular advantages for the treatment of thin (<2 mm thick) aluminosilicate glass sheets for advanced information displays. Such displays generally include thin alkali aluminosilicate glass sheets that are capable, with appropriate ion-exchange strengthening and etch resurfacing, of providing extremely high resistance to bending and impact breakage as well as excellent resistance to visible damage from repeated scratching and abrasion. Thus many of the following descriptions and illustrative examples are directly applicable to the processing of such sheets even though the utility of the etching media and methods of the present disclosure is not limited thereto.

Examples of important applications for such media and methods include use for the etching of glass sheets to be provided with anti-glare surfaces via the surface etching treatment. In advanced methods for producing such surfaces, the glass sheets are provided with porous masking layers, composed for example of polymeric or particulate materials, that prevent or retard etching in masked areas while permitting etching in closely adjacent unmasked areas. The result is a glass sheet with a textured surface that suppresses glare and thus enhances images produced by pixelated information displays protected by the sheet. Methods and materials for providing glass sheets incorporating such anti-glare surfaces are disclosed in published U.S. Patent Applications US2011/0267697 and US2011/0267698, which are expressly incorporated herein by reference for a further description of such methods and materials.

Examples of etching solutions suitable for use in accordance with the present disclosure are aqueous solutions comprising one or more water-soluble inorganic fluoride compounds having utility for the dissolution of silicate glasses. Such compounds may be selected, for example, from the group consisting of HF, sodium fluoride, potassium fluoride, ammonium fluoride, sodium bifluoride, potassium bifluoride, ammonium bifluoride, and combinations thereof.

The amount of surface glass material that must be removed from a glass sheet to achieve the required level of strengthening for information display purposes must be at least sufficient to modify the crack propagation characteristics of the flaws present on the surface of the sheet. At the same time the period of exposure to the selected etching solution must be limited in order to avoid damaging the optical properties of the sheet, for example, by generating excessive haze in sheet surfaces. Thus the selected etching medium must have a composition that can exhibit high surface removal rates without clouding or otherwise degrading the light propagating or reflecting characteristics of the sheet.

To achieve the level of glass dissolution effectiveness required for the processing display glass sheets, etching media provided in accordance with the present disclosure will include one or a combination of secondary strong acids, such as, mineral acids or strong organic acids, that can increase the acidity of the solution. In illustrative embodiments, the secondary acid comprises at least one mineral acid selected from the group consisting of $H_2SO_4$, $HNO_3$, HCl, and $H_3PO_4$.

One particularly effective composition for an etching medium provided in accordance with the present disclosure is a medium wherein the fluoride compound is HF and the secondary strong acid is $H_2SO_4$. The concentration of HF in such a medium will desirably be in the range of about 1-7M and the concentration of $H_2SO_4$, will also be in the range of about 1-7M.

Conventional etching media falling within the above ranges of HF and secondary acid concentration can achieve a strengthening level of glass removal from aluminosilicate display glass sheet within a time interval of less than 10 minutes, more typically less than 5 minutes and in some cases in less than one minute. However, the viscosities of such media are generally low. The viscosity of a typical aqueous 6M HF-7M $H_2SO_4$ etching solution is about 12 cps (centipoise) at 20° C., with the viscosities of the HF, $H_2SO_4$ and $H_2O$ being 0.8 cps, 23 cps, and 1 cps, respectively. Such viscosities permit easy media migration over the surface of glass sheets being etched and thus a variety of optical defects in the etched sheet due to uneven acid concentrations or etching times. FIG. 1 of the drawings illustrates the kinds of defects that have been observed following treatments with such media. These include cloudy glass surface areas (A) as well as clear spots (B) in the etched surface, those types of defects most commonly being due to media surface flow that causes a non-uniform detachment of masking materials from the surface of the glass. Flow line defects (C) can result from etchant surface flows even absent surface masks.

In media provided in accordance with the present disclosure, this deficiency is corrected with small additions of one or more dissolved, water-soluble, high-molecular-weight poly (ethylene oxide) polymer thickening agents. Such thickeners uniquely meet the criteria necessary for substantially improving the etching performance of conventional HF display glass etching media. First, they are effective in small concentrations to substantially increase the viscosity of such media, so that no increases in acid concentrations are needed to maintain the etching efficiencies of such media. Thus, in particular embodiments, thickener concentrations not exceeding about 5% by weight, or even not exceeding about 2% by weight, are sufficient to increase media viscosities to the levels hereinafter prescribed.

Secondly, the above-disclosed thickeners are stable against precipitation, separation, and reactive decomposition in highly acidified HF etching media. "Stable" in the context of the present description means that a medium is absent indications of any of these deteriorating effects that are visible by naked eyes for at least a 24-hour period after initial preparation. In particular, the thickeners are not degraded by strongly oxidizing secondary acids such as $H_2SO_4$. A high level of thickener stability is important to maintain thickening effectiveness and selected acid levels over time, and to avoid media discoloration that can interfere with media transparency. Conventional thickeners such as xanthan gum are subject to decomposition in the presence of $H_2SO_4$, leading to solution discoloration, loss of acidity, and reduced thickening effectiveness. Such gums also produce solutions that can separate in the presence of secondary acids such as HCl.

The media viscosity levels that can be secured in accordance with the present disclosure will depend somewhat on the selection of the particular water-soluble polymer thickener chosen for inclusion in the selected medium. However, embodiments wherein the chosen thickener is a non-ionic, poly (ethylene oxide) polymer having a molecular weight of substantially at least $10^5$ g/mole can readily provide useful levels of thickening over a relatively narrow range of concentrations as disclosed above. In particular embodiments, non-ionic, poly (ethylene oxide) polymers having molecular weights in the range of about $2 \times 10^6$-$4 \times 10^6$ g/mole are employed.

Illustrative examples of poly (ethylene oxide) polymers suitable for inclusion in the presently disclosed media include selected water-soluble Polyox™ resins commercially available from The Dow Chemical Company, Midland, Mich., U.S.A. Particular examples of such resins include Polyox™-301 resin and Polyox™-N60k resin, those polymers having molecular weights of approximately $4 \times 10^6$ g/mole and $2 \times 10^6$ g/mole, respectively. Substantial increases in solution viscosity with the addition of about 2% or less by weight of these polymers to an aqueous medium are attainable due to the high molecular weight of the polymers.

Figure 2:
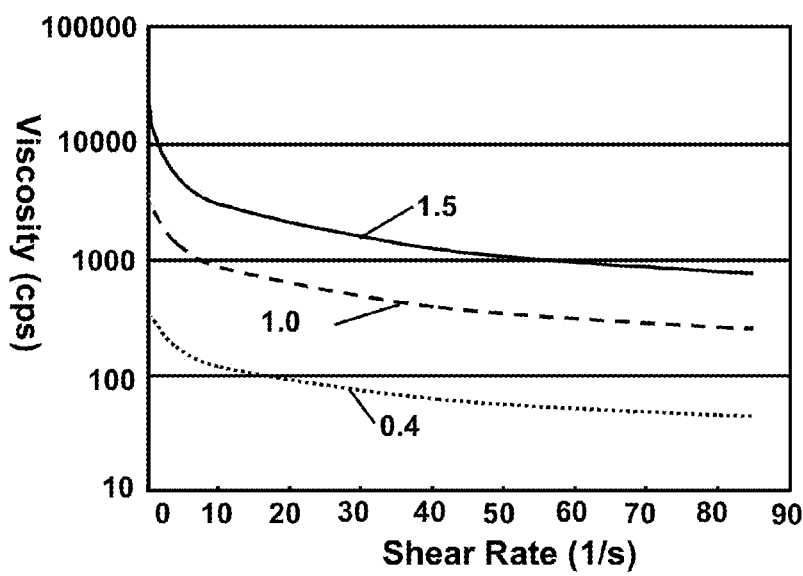
FIG. 2 is a graph plotting viscosity against shear rate for three etching media formulations provided in accordance with the present description.

FIG. 2 of the drawings presents viscosity data for solutions of Polyox™-301 resin in water at three different resin concentrations in the range of 0.4-1.5% by weight. Solution viscosities are reported in centipoise (cps) at solution shear rates in the range of 0-80 per second. These data show that solution viscosities in the range of about 1000 cps can be maintained at shear rates as high as 80 per second even at very modest concentrations of these thickeners. And in the absence of shear the 1% polymer solution provides a solution viscosity of 3750 cps, about 309 times higher than that of a 6M HF and 7M $H_2SO_4$ solution absent any thickener.

As also shown by these data, a further advantage of the disclosed thickeners is the ease with which solution viscosities can be adjusted over wide ranges through only small adjustments in thickener concentration. Thus a viscosity increase from 3750 cps to 22500 cps can be achieved simply by increasing solution resin concentration from 1% by weight to 1.5% by weight.

The long-term stability of the above-disclosed thickeners is confirmed by testing the acidity levels of the thickened media over prolonged storage periods. Table 1 below reports total acidity values as determined by tests of molar acid concentrations taken on a thickened solution over a 12-day storage period. The medium evaluated is an aqueous acid paste of 5M HF and 6M $H_2SO_4$ acid concentration comprising 1.6% by weight of dissolved a Polyox™-N60K poly(ethylene oxide) resin thickener. The acid concentrations levels are determined by titration. No significant changes in paste acidity are noted over the duration of this testing period.

TABLE 1

Acid Level Stability in Thickened Etching Pastes

|  | Age of Paste (days) | | |
| --- | --- | --- | --- |
|  | 1 | 3 | 12 |
| Total Acidity (M) | 17.39 | 17.45 | 17.32 |

Glass etching media within the scope of the present disclosure may be prepared using only slight changes to conventional methods. In an illustrative procedure, an aqueous acid solution with targeted HF and secondary acid concentrations is first prepared, and a selected polymer thickener such as Polyox™-301 resin, available as dry powder, is then dispersed in the solution. The amount of the powder addition will be based on the targeted viscosity. The solution with dispersed resin is then mechanically stirred for up to approximately 12 hours until the resin is fully dissolved and a homogeneous solution is produced. Reduced mixing times can be employed if the powder is gradually added to the solution with stirring and/or if the solution is heated (e.g., to 60° C.) during stirring.

A normal expectation with fluoride etching solutions thickened to the degree shown in FIG. 2 of the drawings is that the increased viscosity will reduce mass diffusivity and thus the etching efficiencies of the solutions. Surprisingly the presently disclosed solutions do not exhibit this behavior. Table 2 below presents data comparing glass etching rates as between a typical acid solution and a thickened solution (i.e., paste) of the same acid concentration. Both etching media are aqueous $HF/H_2SO_4$ preparations of 5M HF and 6M $H_2SO_4$ acid concentrations, with the paste medium additionally comprising 1% by weight of Polyox™-301 resin.

The data presented in Table 2 consist of etching depths in micrometers as determined by measuring the thickness of surface glass removed from partially etched aluminosilicate glass coupons comprising masked and unmasked surface sections. Coupon thickness changes are measured following a 30-second exposure to the etching media. A first set of coupons is exposed to the low-viscosity acid solution by dipping the coupons directly into the solution. A second coupon set is dipped into the thickened acid etching paste while a third coupon is draw-bar coated with the etching paste to a depth of about 0.7 mm. All coupons are rinsed with deionized water at the conclusion of the 30-second etching period. As the data in Table 2 suggest, there appears to be no reduction in etching efficiency caused by the addition of the polymer thickener to the low-viscosity acid solution or the large increase in etching medium viscosity resulting from that addition.

TABLE 2

Glass Etching Depths in Paste and Liquid Etching Media

| Etching Medium - Method | Glass etch depth (um) |
| --- | --- |
| Solution - dip | 4.5 |
| Paste - dip | 5.0 |
| Paste - drawn layer | 4.6 |

Although dipping is a suitable method for contacting display glass sheets with an etching medium such as herein disclosed, alternative methods comprising the application of a layer of a thickened etchant to one or both surfaces of such sheets can offer significant advantages. Particular examples of advantageous embodiments of such methods are those wherein the step of exposing the glass to an etching medium comprises depositing a layer of the medium on the surface of the glass while suppressing lateral flow of the medium across the surface. Suppressing such flow is particularly important where a layer of a masking material is present on all or a portion of the sheet to be etched, since lateral flow of etching media can entirely or partially detach such masking materials.

Figure 3:
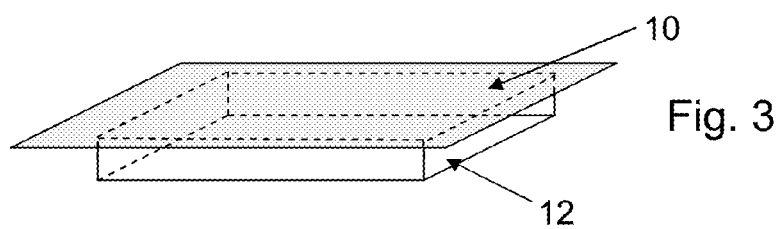
FIG. 3 shows a display glass sheet positioned for etching on a suitable support.

The suppression of lateral medium flow is greatly facilitated if the step of depositing a layer of the medium is carried out while the glass sheet is horizontally disposed on an underlying support. In the practice of those methods, it is also advantageous that the underlying support be of a smaller circumference than a circumference of the glass sheet, for example, by arranging that the support at least be recessed from leading and trailing edges of the glass sheet. These measures reduce the risk of a transfer of etching medium from the glass to the support in a way that could compromise etching paste layer uniformity. FIG. 3 of the drawings schematically illustrates a suitable arrangement for disposing a glass sheet 10 on a support 12 of smaller peripheral dimensions (circumference) than the sheet.

The use of coating rather than dipping methods may also be advantageous in that they can more easily secure uniform time intervals of exposure to the etching medium across the entire dimensions of large glass sheets. There are a number of coating systems that can easily allow an etching layer to be successively deposited from a first edge to a second edge of the surface of a glass sheet at a predetermined rate, and thereafter successively removed from the first edge to the second edge at the same predetermined rate. The result is that all points on the surface of the sheet remain in contact with the etchant for an equivalent time period.

Any one of a number of different procedures can be adopted for depositing a uniform coating of an acidic paste etchant on the surface of a glass substrate in accordance with the presently disclosed etching methods. Illustrative procedures include those selected from the group consisting of draw bar spreading, waterfall coating, curtain coating, and slot coating.

Figure 4:
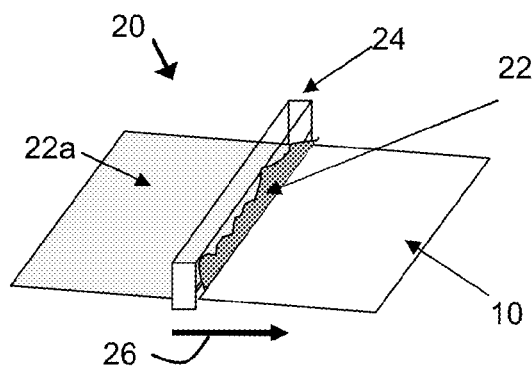
FIG. 4 schematically illustrates a draw bar method for coating a glass sheet with an etching medium.

FIG. 4 of the drawings schematically illustrates a coating procedure utilizing a draw bar coating apparatus 20. In the practice of that procedure, a quantity of an etching paste 22 is dispensed from a reservoir (not shown) onto the surface of a glass sheet 10, and is spread over the surface of sheet 10 by draw down bar 24. Spreading paste 22 in spreading direction 26 results in the formation of a paste coating 22a on the surface of the glass sheet 10. Either the glass or, more preferably the bar, can be moved in this procedure. Avoiding movement of the coated glass during the etching period may advantageously decrease the risk of mask detachment where, for example, an etching mask for providing an anti-glare surface finish on the glass sheet has previously been applied.

A gap provided between draw bar 24 and the surface of the glass can be adjusted to control the thickness of paste layer 22a applied to the glass surface. In these and other procedures for applying acid paste coatings in accordance with some embodiments of the present disclosure, the thickness of the paste layer 22a will generally be greater than 0.1 mm, and in some embodiments greater than 0.2 mm, to insure sufficient glass surface removal within a short etching interval. Etching intervals not exceeding 10 minutes, or in typical embodiments less than one minute or even less than 30 seconds, are suitable for carrying out any of the available coating procedures. At the end of the selected etching interval, the etching paste may be removed by a blade or by a liquid stream of, for example, deionized water. Again, it is generally advantageous that the direction and speed of paste removal are equivalent to those of paste application, so that there is no etching time difference as between the leading and trailing edges of the glass sheet.

Figure 5:
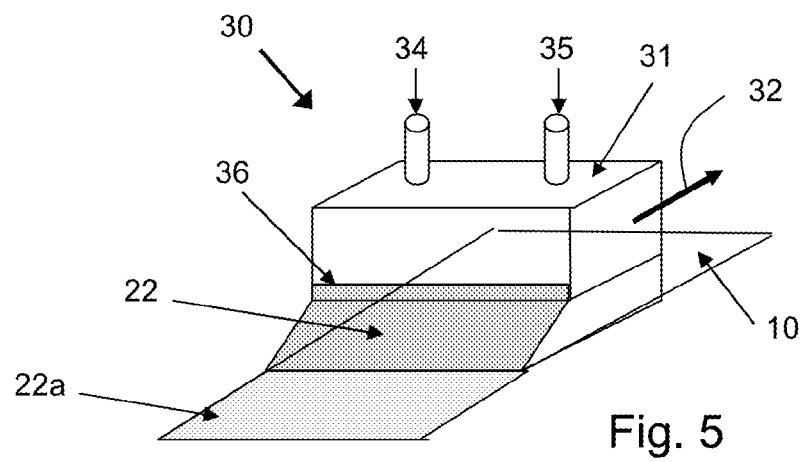
FIG. 5 schematically illustrates a waterfall method for coating a glass sheet with an etching medium.

An alternative procedure and apparatus for applying an acid paste etchant to the surface of a glass sheet is schematically illustrated in FIG. 5 of the drawings. In accordance with that procedure, a "water fall" coater 30 comprising an acid etching paste reservoir 31 is positioned over the surface of a glass sheet 10, reservoir 31 including a paste discharge slot and slide 36 for discharging and dropping an etching paste 22 onto the surface of glass sheet 10 to form a paste layer 22a.

For proper paste distribution and to avoid contact between the slide and surface of glass sheet 10, the trailing edge of the slide makes an angle not exceeding approximately 60° with the glass sheet surface and is spaced from about 0.5-10 mm from that surface during travel of the reservoir and slide 31, 36 in paste deposition direction 32. A discharge slot width in the range of about 0.8 to 2.1 mm can insure an adequate flow of paste from the reservoir. Maintaining a reserve of paste in reservoir 31 can be accomplished by pumping additional paste into the reservoir via paste inlet 34. Discharge of the paste can be by gravity or by pressurizing reservoir 31 with a gas via gas inlet 35.

A particular advantage of water-fall coating in accordance with FIG. 5 is the low momentum of the paste as it comes into contact with the surface of glass sheet 10. Low impact along the line of paste deposition avoids mask disturbance and possible detachment where an anti-glare etching mask is present on the glass sheet.

Figure 6:
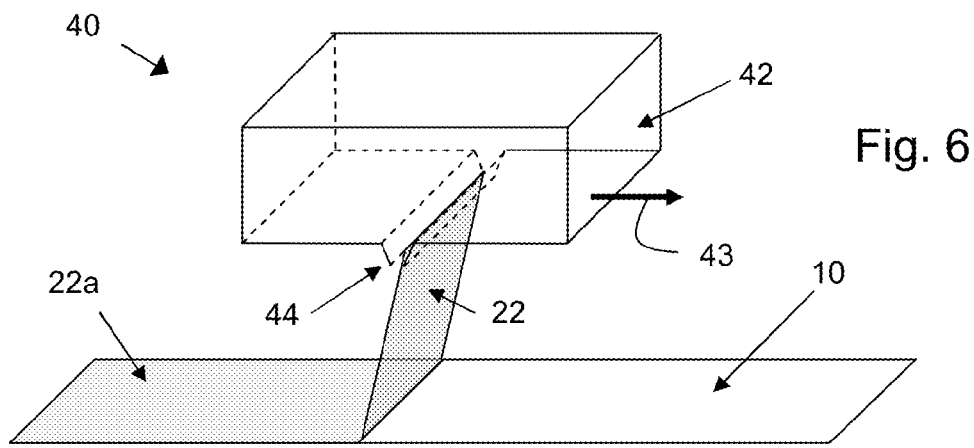
FIG. 6 schematically illustrates a curtain coating method for coating a glass sheet with an etching medium.

FIG. 6 of the drawing presents a schematic illustration of yet another procedure and apparatus for applying a layer of an acid etching paste to the surface of a glass sheet. In accordance with that procedure, a curtain or slot coater 40 comprising an acid etching paste reservoir 42 with a bottom paste discharge slot 44 is caused to travel in a coating direction 43 over a glass sheet 10 to be coated. A curtain of acid etching paste 22 is discharged from slot 44 to form a paste coating 22a on the surface of sheet 10. A suitable thickness for paste coating 22a can be secured through the use of an adjustable discharge slot 44 to maintain a discharge pressure in the range of about 0.5-4 psi in paste reservoir 42.

To facilitate the effective coating of display glass sheet utilizing the above or similar procedures for applying uniform coatings, embodiments of the disclosed methods wherein the poly(ethylene oxide) polymer thickener is present in the acid etching medium at a concentration not exceeding about 5% by weight are effective. The use of concentrations in that range can provide etching media with viscosities in the range of about 120-6200 cps (centipoises) at a shear rate of about 10 1/s. Paste viscosities lower than about 120 cps can allow paste flow across sheet surfaces, particularly near the edges of the sheets being coated, resulting in an increased likelihood of optical defects and/or non-uniform etching of the sheets. On the other hand, pastes with viscosities above about 6200 cps present substantial difficulties with respect to the attainment of uniform coating thicknesses, and can introduce surface cloudiness during the etching of masked glass sheets.

The various advantages attending the use of polymer-thickened etching media in accordance with the present disclosure can be secured without in any way compromising the strength-enhancing benefits of the brief etching treatments presently used for advanced display glass applications. In addition, the optical quality requirements for such display glasses can still be met.

Table 3 below sets forth representative data relating to the optical properties of ion-exchange-strengthened aluminosilicate display glass sheet samples first provided with etching masks to enable anti-glare surface production and then subjected to surface etching treatments to strengthen the glasses and develop anti-glare surface layers thereon. In a typical evaluation, one set of samples is surface-etched by conventional dipping in a low-viscosity acid etching solution, while another set is surface-etched by coating with an acid paste etching medium of the same acid content as the low viscosity solution. Both of the etching media contain HF at a 5M concentration and $H_2SO_4$ at a 6M concentration. The paste medium additionally contains 2% by weight of a Polyox™-N60K resin thickener.

Reported in Table 3 for each of the treated samples are an identification of the treating method, the duration of that treatment, and the optical haze, distinctness of image (DOI), and pixel power deviation (PPD) values determined on the samples subjected to the treatments. The haze values correspond to the measured percentages of light transmitted through a sample that is scattered outside of an angular cone of ±4.0°, as measured in accordance with ASTM D1003. The DOI values are as determined in accordance with method A of ASTM D5767 entitled "Standard Test Methods for Instrumental Measurements of Distinctness-of-Image Gloss of Coating Surfaces". The PPD values, which are a relative measure of the perceived "sparkle" of a pixelated display image covered by an anti-glare display surface, correspond to the standard deviations from the mean brightness of a collection of display pixels as measured for an LCD display image covered by the samples.

TABLE 3

Optical Properties of Etched Glass Surfaces

| Etching Method | Etching time (seconds) | Haze (%) | DOI (%) | PPDr0° (%) | PPDr90° (%) |
|---|---|---|---|---|---|
| Dipping - Low Viscosity Solution Medium | 30 | 4.3 | 75.1 | 6.4 | 6.2 |
|  | 30 | 4.3 | 73.8 | 6.4 | 6.4 |
| Curtain/Slot Coating - High Viscosity Paste Medium | 20 | 6.2 | 76.4 | 5.6 | 5.7 |
|  | 20 | 6.5 | 62.7 | 6.4 | 6.4 |
|  | 25 | 6.7 | 59.3 | 6.2 | 6.4 |
|  | 20 | 6 | 53.5 | 6.8 | 6.8 |

The data resulting from the above comparison indicate that paste etching provides surface optical properties substantially equivalent to those obtained through dip-etching in conventional low-viscosity etching solutions. No significant differences in display "sparkle" (PPD values) were found. The somewhat higher haze levels in the paste-etched samples reported in Table 3 are still well within acceptable levels, and are additionally offset by significantly lower DOI levels, those lower levels being particularly important for good anti-glare performance. The lower DOIs are attributed at least in part to the avoidance of paste media flow over the glass surface during the etching treatment, resulting in greatly reduced anti-glare etching mask disturbance.

The processing advantages secured through the use of the presently disclosed etching methods are substantial. The need for a large etching bath of substantial surface area to accommodate the dip etching of large sections of glass sheet may be eliminated, reducing acid loss through the vaporization of acid constituents such as HF and HCl. The need to continuously replenish fluoride consumed during dip-etching, as well as the need to circulate or replace the bath to remove accumulating the sludge by-products of etching may also be eliminated. In contrast, applying a coating of fresh acid etching paste to each glass surface to be etched insures constant etching conditions and avoids or reduces problems relating the accumulation of sludge or dissolved masking materials in the etching medium. In addition, acid evaporation from the medium is minimal since the paste medium is not exposed to air until it is dispensed onto the glass surface, and the application and removal of the etching paste layer can easily be controlled such that there is no or substantially no etching difference as between the leading and trailing edges of that surface.

While the etching media and methods of the present disclosure have been described above with respect to particular embodiments of those media and methods, it will be apparent from the foregoing disclosure that those particular embodiments have been presented for purposes of illustration only, and that a wide variety and number of alternative embodiments may be selected to meet the requirements of new or existing applications within the scope of the appended claims.

We claim:

1. A glass etching medium comprising at least one water-soluble inorganic fluoride compound, at least one secondary strong acid, water, and a dissolved, water-soluble, high-molecular-weight poly (ethylene oxide) polymer thickener, wherein
   the at least one water-soluble inorganic fluoride compound comprises HF,
   the at least one secondary strong acid comprises a mineral acid selected from the group consisting of $H_2SO_4$, HCl, and $H_3PO_4$, and the high-molecular-weight poly (ethylene oxide) polymer thickener has a molecular weight in the range of about $2\times10^6$–$4\times10^6$ g/mol.

2. A medium in accordance with claim 1, wherein the HF is present in the medium at a concentration in the range of about 1-7M.

3. A medium in accordance with claim 1, wherein the water-soluble polymer thickener is a non-ionic, poly (ethylene oxide) polymer having a molecular weight of substantially at least $10^5$ g/mol.

4. A medium in accordance with claim 1, having an etching rate substantially equivalent to that of a second medium of equivalent composition absent the polymer thickener.

5. A medium in accordance with claim 1, wherein the secondary strong acid is $H_2SO_4$ and is present in the medium at a concentration in the range of about 1-7M.

6. A medium in accordance with claim 5, that is stable against separation and precipitation, and stable against oxidative decomposition in aqueous $H_2SO_4$ at $H_2SO_4$ concentrations in the range of about 1-7M.

7. A method for etching a glass sheet comprising a step of exposing a surface of the sheet to an acidic fluoride etching medium comprising: a dissolved, water-soluble, high-molecular-weight poly (ethylene oxide) polymer thickener; HF; and at least one secondary strong acid selected from the group consisting of $H_2SO_4$, HCl, and $H_3PO_4$.

8. A method in accordance with claim 7, wherein the surface includes masked areas protected from exposure to the medium.

9. A method in accordance with claim 7, wherein the medium used to carry out the step of exposing is substantially free of dissolved glass constituents.

10. A method in accordance with claim 7, wherein the high-molecular-weight poly (ethylene oxide) thickener has a gram molecular weight of substantially at least $10^5$ g/mol.

11. A method in accordance with claim 7, wherein the thickener is present in the medium at a concentration not exceeding about 5% by weight and the medium has a viscosity in the range of about 120-6200 centipoise at a shear rate of 10 l/s.

12. A method in accordance with claim 7, wherein the thickener is resistant to oxidative decomposition in aqueous $H_2SO_4$ at acid concentrations in the range of about 1-7M.

13. A method in accordance with claim 7, wherein substantially all areas of the surface exposed to the etching medium are exposed for a selected substantially identical exposure time.

14. A method in accordance with claim 13, wherein the selected exposure time is at least sufficient to reduce the impact fracture strength variability of the glass, but less than a time effective to produce a strengthened glass sheet having a haze level greater than 20%.

15. A method in accordance with claim 13, wherein the glass sheet is provided with a surface masking layer effective to produce an anti-glare surface on an etched glass sheet, and wherein the selected exposure time is greater than a time that produces an anti-glare surface with a DOI exceeding 80.

16. A method in accordance with claim 7, wherein the step of exposing comprises depositing a layer of the etching medium on the surface while suppressing lateral flow of the medium across the surface.

17. A method in accordance with claim 16, wherein the layer is successively deposited from a first edge to a second edge of the surface at a predetermined rate, and thereafter successively removed from the first edge to the second edge at the predetermined rate.

18. A method in accordance with claim 16, wherein the step of depositing is carried out by a procedure selected from the group consisting of draw bar spreading, waterfall coating, curtain coating, and slot coating.

19. A method in accordance with claim 16, wherein the step of depositing is carried out while the glass sheet is horizontally disposed on an underlying support of a smaller circumference than a circumference of the glass sheet.

* * * * *